US006973356B2

(12) United States Patent
Bieber

(10) Patent No.: US 6,973,356 B2
(45) Date of Patent: Dec. 6, 2005

(54) METHOD AND ASSEMBLY FOR OPERATING AND/OR OBSERVING A DEVICE THAT MONITORS AN INDUSTRIAL CONTROLLER

(75) Inventor: Juergen Bieber, Ettlingen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/666,126

(22) Filed: Sep. 22, 2003

(65) Prior Publication Data

US 2004/0117049 A1 Jun. 17, 2004

Related U.S. Application Data

(63) Continuation of application No. PCT/EP02/02811, filed on Mar. 13, 2002, and a continuation-in-part of application No. 09/812,205, filed on Mar. 13, 2002.

(30) Foreign Application Priority Data

Apr. 23, 2001 (DE) .................................. 101 19 990
May 18, 2001 (DE) .................................. 101 24 350

(51) Int. Cl.$^7$ ............................................. G05B 19/18
(52) U.S. Cl. ..................... 700/65; 700/17; 700/83; 702/188; 340/531; 707/10; 709/217; 709/224; 709/232; 709/245
(58) Field of Search ........................ 700/17, 65, 83; 709/201, 203, 217, 223, 224, 219, 227, 228, 709/230–232; 340/500, 531, 501, 506; 707/10; 714/11, 47

(56) References Cited

U.S. PATENT DOCUMENTS 4,303,973 A * 12/1981 Williamson et al. .......... 700/84
4,408,345 A * 10/1983 Yashiro et al. ............... 725/107
4,432,054 A *  2/1984 Okada et al. .................. 702/9
4,568,934 A *  2/1986 Allgood .................. 340/870.02
4,988,988 A *  1/1991 Kimura ...................... 340/3.44
5,325,287 A *  6/1994 Spahr et al. .................. 700/17
5,485,142 A *  1/1996 Stute et al. .................. 340/506
5,689,671 A * 11/1997 Stromberg ................... 709/245
5,822,205 A * 10/1998 Arihara et al. ................ 700/86
5,914,666 A *  6/1999 Zingsheim et al. .......... 340/3.5
5,920,479 A    7/1999 Sojoodi et al.
6,389,461 B1 *  5/2002 Shah .......................... 709/217
6,457,040 B1 *  9/2002 Mizuhara et al. ........... 709/201
6,678,737 B1 *  1/2004 Bucher ....................... 709/231
6,717,382 B2 *  4/2004 Graiger et al. .............. 318/587
6,772,017 B1 *  8/2004 Dove et al. .................. 700/18

FOREIGN PATENT DOCUMENTS

| DE | 43 20 124 A1 | 12/1994 |
| DE | 195 17 162 A1 | 10/1995 |
| DE | 44 43 617 A1 | 6/1996 |
| DE | 196 34 165 A1 | 4/1998 |
| DE | 198 31 405 A1 | 1/2000 |

(Continued)

Primary Examiner—Wilbert Starks, Jr.
Assistant Examiner—Crystal J Barnes
(74) Attorney, Agent, or Firm—Sughrue Mion, PLLC

(57) ABSTRACT

A system for operating/observing a monitoring device of a process controller device of/in a remote operator unit. An additional function block is provided in/on the monitoring device, which intervenes in the communication between the monitoring device and the connected operator units, at least partially takes over the functions that are to be executed by one or more of the operator units and processes the information to be displayed on the operator unit in such a way that the information can be directly displayed.

46 Claims, 2 Drawing Sheets

3 Control Device
4 Operating/Monitoring Device
5 Display
6 Operator Terminal
7 Other Operator Terminal
8 Operating/Monitoring Function Block
9 Interface Function Block
10 Management Part
11 Execution Part
13 Further Server Computer
14 Further Server Computer

FOREIGN PATENT DOCUMENTS

| | | |
|---|---|---|
| DE | 299 19 087 U1 | 2/2000 |
| EP | 0 429 056 A2 | 5/1991 |
| EP | 0 825 506 A2 | 2/1998 |
| EP | 825506 A2 * | 2/1998 ......... G05B 19/418 |
| WO | WO 99/67690 A1 | 12/1999 |
| WO | WO 01/02891 A2 | 1/2001 |

* cited by examiner

3 Control Device
4 Operating/Monitoring Device
5 Display
6 Operator Terminal
7 Other Operator Terminal
8 Operating/Monitoring Function Block
9 Interface Function Block
10 Management Part
11 Execution Part
13 Further Server Computer
14 Further Server Computer 3 Control Device
4 Operating/Monitoring Device
6 Operator Terminal
7 Other Operator Terminal
8 Operating/Monitoring Function Block
9 Interface Function Block
11 Execution Part
13 Further Server Computer
14 Further Server Computer
17 Separate Interface Unit
18 Peripheral Device

METHOD AND ASSEMBLY FOR OPERATING AND/OR OBSERVING A DEVICE THAT MONITORS AN INDUSTRIAL CONTROLLER

This application is a Continuation of International Application PCT/EP02/028 11, with an international filing date of Mar. 13, 2002, which was published under PCT Article 21(2) in German, and the disclosure of which is incorporated into this application by reference; this application is additionally a Continuation-In-Part of U.S. application Ser. No. 09/812,205, filed Mar. 13, 2002.

FIELD OF AND BACKGROUND OF THE INVENTION

The invention relates to a method and an assembly for operating and/or observing a device for monitoring at least one controller, coupled with an installation or process, of/in at least one remote operator unit that communicates with the monitoring device.

The capacity of computers continues to increase and open up new applications in the field of industrial control and monitoring systems. As a result, monitoring tasks are increasingly delegated to programmable controllers. Whereas initially only isolated parts in industrial production plants were automated, today nearly all the parts of modern plants can be integrated into an automation concept. Although for the most part, separate control devices are associated with individual plant complexes, these devices can mutually exchange information to improve efficiency. For example, if problems occur in one part of the plant, the production of supplied parts can be reduced accordingly and quickly. This information exchange can occur either directly or with the aid of a higher-level communications device, which also represents, for example, a central monitoring means from which different information on the different plant sections can be obtained and, if necessary, influenced.

On the other hand, in large plants spread over a wide area with many different machines or other functional units, local operator units are required, e.g., to be able to change parameters quickly or to restart the respective machine manually after correcting a local fault. The tendency, therefore, has been to use a server/client concept for the monitoring and operating structure of such plants. One or more server computers convert the desired parameter corrections into commands for the corresponding local control devices and transmit them to these devices. The client computers each contain a program that controls and manages the user interface of the man-machine interface, and for this purpose interprets the commands and information entered at the corresponding client computer, e.g., via a keyboard. This program then obtains, for example, the operator-requested information on the state of a plant part via the connected server computer, such as from the respective control device, and processes and displays this information to give the operator, for example, an information basis for making a decision on the process parameters to be changed, etc. If a parameter change is subsequently requested, this request is separated, for example, into the information "change parameter" and "new value" and in this manner is transmitted as an instruction to the server computer. The server computer converts this instruction into a character string understandable by the corresponding control device and sends it to the selected control device.

Since this procedure does not provide the server computer with any information on the different program steps of the client computers, it is not possible, for example, to operate several client computers in parallel because the current user interfaces of the different client computers cannot be coupled together. As a result, for reasons of space, an operator cannot quickly switch between two operator units, e.g., during startup. Alternatively, if the operator switches between operator units, the respective user interface on the new operator unit must first be set up using various key combinations. In complex monitoring systems this is relatively complicated because of the many different selection criteria involved in addressing a specific plant part. A further drawback of this arrangement is that the different client computers must be operated with an extensive program, which must also include a large amount of information on the actual plant and its control concept. As a result, with every change in the plant structure and/or the control structure, not only the software of the control devices and the monitoring server computer but also the software of the monitoring client computers must be updated to the latest version. This is time-consuming and has proven to be extremely cumbersome, especially during startup phases when repeated changes have to be made in the closed-loop control structures.

OBJECTS OF THE INVENTION

Based on these drawbacks of the described prior art, one object of the invention is to provide an option for improving or simplifying the structure of the generic monitoring systems with at least one monitoring server computer and preferably a plurality of connected monitoring client computers in such a way that an operator can "transport" the currently set-up, individual user interface from one monitoring client computer to another with the least possible effort. Even if the plant structure and/or control structure is changed, it should be possible to adapt, i.e., to update, with the least possible effort, the user interfaces of the monitoring client computers with respect to the displayable structures, information and/or the executable operator actions.

SUMMARY OF THE INVENTION

According to one formulation of the invention, these and other objects are attained by providing, within the scope of the monitoring device or a computer connected thereto, an additional function block, which is stored, in particular, in the form of an additional program. This function block intervenes as an interface module in the communication between the monitoring device and the connected operator units and evaluates and processes the information addressed to a connected operator unit in such a way that the respective operator unit can directly display the subsequently forwarded information, in the manner of a terminal.

With this measure, the user interface of the connected monitoring client computers is no longer controlled locally but via the network, by an interface module that is installed in the server computer or in a device directly connected thereto. As a result, the information on the current state of the user interfaces of all the active client computers is relocated to the server computer. Upon request by an operator, the user interface currently set up on an operator unit can therefore be transferred immediately to another operator unit. In addition, the information on the plant structure and/or control structure required to set up the user interfaces is preferably also relocated to the interface module according to the invention, which is installed in the area of the server. As a result, when these same structures are changed, only the interface module or the data it uses needs to be changed. This can be done in a single step together with the change in the actual monitoring function block of the respective server computer. This significantly reduces the installation work involved in changing the plant structure and/or control structure. At the same time, the activities to be carried out by a client computer are minimized, i.e., to the relaying of information from the higher-level server computer to a display screen on the one hand and the information that is entered by an operator to the server computer on the other. Because the client computer uses separate input/output modules—e.g., display screens, keyboard, mouse—the actions to be carried out by the actual client computer are so simple that the minimum program that is still required for this purpose can easily be designed to run with a wide variety of operating systems. For this reason and because of the reduced client computer hardware requirements, a user is able to fall back on inexpensive offers for this purpose. Furthermore, there is no risk that such client computers become quickly obsolete—a typical occurrence in the computer industry—because the more complex computing tasks are performed exclusively in the server computer.

It has proven to be advantageous if the additional function block assumes at least partially the functions, particularly the program steps, which are to be executed by an operator unit. This shifting of the computational activity includes, in particular, also a shift of information from the client computer to the server computer. This increased centralization and integration of the information makes it easier on the one hand to transfer corresponding operating information from one connected client computer to another. In addition all the information of the monitoring network can be accessed centrally, so that it becomes substantially easier to modify this information.

It falls within the scope of the intention that an additional program part used as an interface function block is at least partially loaded into the working memory of the monitoring unit—or the corresponding computer connected thereto—for execution. Since, as a rule, a server computer used for monitoring has a display screen and keyboard connected to it, it is possible to run the monitoring system in "minimum operation" even if all the client computers are shut down. In this case, the function block according to the invention is not required because the actual monitoring function block can be operated on the server computer itself, i.e., directly. If the additional function block is designed as a program part, it can be removed from the server computer's working memory to improve the performance of the server computer. In this case it must be reloaded, however, as soon as at least one client computer sets up a communications connection with the server computer.

Further advantages result if the additional function block, particularly a program part, can be multiply accessed, especially by different operator units. In this case the additional function block or program part executes the individual computations associated with the corresponding operator unit and stores the computation results in the corresponding operator unit in such a way that they can be uniquely assigned. Although the interface function block according to the invention can serve a plurality of connected client computers, it can nevertheless strictly separate the communication with the different client computers, so that different operators at different client operator stations can program simultaneously and completely independently from each other. As a result, service personnel, for example, can test a machine or restart it after correcting a fault using an operator unit associated with this machine, while other machine parameters can be corrected, for example, using an operator unit in a different part of the plant.

It has proven to be advantageous if the additional function block, particularly a program part, individually addresses different connected operator units. This measure, too, is intended to decouple the program steps carried out on different operator units, so that despite the accumulation of information in the server computer, the previous behavior of mutually independent client computers can be simulated and simultaneous entries can be made.

Since the additional program part can be addressed by the monitoring logic or the monitoring program of the monitoring device using different parameters, particularly device addresses, the associated operator units can be accessed individually. This enables unique bidirectional communication between an operator unit and a control device, without information having to be transferred to other operator units or client computers that have not requested this information. The interface module according to the invention, however, can assume a similar function by comparing information received from a control device with the information requested by the different operator units and by forwarding this information only if there is a correlation between the requested and the received information.

It has proven to be advantageous if the communication between the additional interface function block and the monitoring function block of the monitoring device is combined in a single channel. In this case, the communications channel can be a memory area to which the interface function block writes data and from which the monitoring function block reads data, e.g., based on the FIFO principle, possibly with an additional memory area for information going in the opposite direction. The information can then be specifically forwarded to the corresponding control device or to the currently associated client computer by using, for example, the ID digits or the like, which are transmitted together with the information.

Furthermore, the additional interface function block can have a plurality of channels for communication with a plurality of monitoring function blocks and/or monitoring devices. There are many prior art control devices made by various manufacturers as well as respectively associated monitoring function blocks, which can be loaded into and executed on different monitoring server computers or even one and the same monitoring server computer. In such a case, the interface function block according to the invention can have a corresponding number of channels to enable communication of all the operator units with all the function blocks. Such communication channels can each be configured, for example, as two FIFO memory blocks for antiparallel information flow directions.

Particularly advantageously, the additional interface function block, in downlink communication (from the monitoring device to an operator unit), is operated as a distributor, especially a demultiplexer. This means that the information received from one or a plurality of monitoring function blocks is forwarded only to the operator unit interested in this information, so that the data from a monitoring function module that may be coming in on the same channel is forwarded to a client computer on a respectively selected output channel.

In uplink communication (from an operator unit to the monitoring device), the additional interface function block can be operated as a signal-combining block, e.g., like an OR link, but especially as a multiplexer. Here, the commands and information of the many different client computers, which are addressed to the same monitoring function block, must be combined into one channel. If, for example, the interface function block according to the invention supplements the corresponding information with an identification digit that can be detected in the monitoring function block, this same identification digit can be easily used in a reply by the monitoring function block to establish a 1:1 association with the corresponding operator unit. As a result, inputs by different client computers can be processed almost simultaneously.

The uplink communication is preferably priority-controlled. This prevents conflicts, e.g., in case of competing access to the same machine parameters. It is also possible to combine simultaneous and priority-controlled access. For example, the monitoring client computers, which are spread out across a plant, can each be assigned to individual plant areas. Within such a plant area only a single client controller can be active in a priority-controlled manner. However, in relation to other parts of the plant where other machine parameters are predominantly or exclusively modified, a plurality of client computers can be simultaneously operated (each having priority within its plant area).

One advantageous arrangement provides that in the priority assignment to an operator unit, incoming information from another operator unit is suppressed or redirected to a buffer assigned or assignable to the corresponding operator unit. For this purpose, a distinction can be drawn as to whether the incoming information are queries and, if so, whether the desired information can be obtained and forwarded irrespective of another priority assignment, while instructions for parameter changes may possibly be suppressed or at least delayed to exclude mutual interference with other operators.

The invention may be further refined in that the additional function block manages all the connected operator units and possibly the memory areas assigned thereto, particularly for buffering incoming information. In this connection, the term "management" should be understood as the creation and maintenance of a management data record associated with each operator unit configured as a client computer, including current information on the corresponding hardware, e.g., size of the screen memory, etc., and/or the momentary state of the user interface, e.g., the displayed screen mask, position of a cursor, etc. The term can also be understood as the starting addresses of memory areas where incoming information from the corresponding client computer is buffered or where information to be output is stored, e.g., including the addresses of hardware interface modules and/or the addresses used in a network for the corresponding client computer.

A further feature according to the invention, if an additional program is used as an interface function block, is that an operator unit is initially logged on by calling a starting address. This is preferably a relative starting address, which is based on the classification of a memory area into subdirectories and consists of a character sequence that a command processor looks up in an index list of the corresponding directory to find the actual starting address.

The invention further provides the option that an additional program used as an interface function block checks when an associated starting address is called to determine whether at least one operator unit is already logged on and, if this is not the case, goes through an initialization phase first and, for example, starts the communication with the monitoring block of the monitoring device. During this process, it is first determined whether a program used as an interface function block is already loaded into the working memory of the server computer. This is to detect whether the interface function block is already active in connection with another client computer. If not, the interface function block is first activated in an initialization phase, i.e., it is loaded into the working memory of the server computer and is logged on to the monitoring function block(s).

Furthermore, when the starting address associated with the additional program is called, an additional management data record is created for the newly logged-on operator unit and, if necessary, a memory area is assigned to it. When an additional client computer logs on, after the interface function block according to the invention has been set up in the previous step if required, a management data record associated with this additional client computer is created and, if required, a memory area is reserved as an information buffer. Such a memory area can have, for example, the size of a bitmap if the server computer takes over the entire screen display of the client computer. This enables the function block according to the invention to perform other tasks during the transmission of the picture data thus determined, so that fast simultaneous operation serving a plurality of client computers is made possible.

The invention further provides that if an operator unit newly logs on, information on its hardware structure is obtained and stored in the corresponding management data record. While the operating system implemented in a client computer is of secondary importance, details of the hardware configuration of the respective client computer may be significant, especially the peripheral devices connected to it. They may be obtained when a management data record is created. It is also possible, however, to continue to use the management data record associated with a uniquely identifiable client computer if this record was not deleted after the respective client computer was last decoupled.

In a further refinement of the concept according to the invention, the additional function block includes an execution part, which is called by the management part and is supplied with the information associated with an operator unit. This execution part subsequently takes over the program steps that were actually to be carried out by the operator unit. As the result information, the execution part supplies, e.g., a bitmap that can be loaded into a screen memory. The management part calls the execution part when an input from a client computer is to be processed. This can be an information line or instruction line that is completed with an end-of-line key or also an identifiable function entered by mouse click, which was sent by the client computer after completion of the entry. This (instruction) information is available, for example, in a predefined memory area of the server computer. The program steps to be executed are stored in the execution part itself or in a database connected thereto. The execution part can find any additional information that may be required for proper execution in the associated management data record. If the result supplied by the execution part involves a large amount of data to be transmitted, the data can be buffered before being transmitted to the corresponding client computer for a peripheral interface module. During this time the function block according to the invention can already turn to other tasks.

To generate the result information in a suitable format, the execution part can access the information stored in the corresponding management data record on the hardware characteristics of the corresponding operator unit, e.g., the size of the screen memory, etc. The result information thus generated is then already in a form compatible with the peripheral hardware of the client computer, and the client computer only has to transmit it to the respective peripheral unit.

An advantageous configuration of the invention is obtained if the management part converts the result information of the execution part into a predefined transmission data format and sends it to the corresponding operator unit, e.g., together with the instruction to load a transmitted bitmap into the screen memory. The accompanying instruction may be limited to specifying the destination device, so that the client computer knows whether the corresponding information must be output on a screen or written, for example, to a disk drive.

To perfect the method according to the invention it may be provided that the data format in the communication between the operator units and the interface function block and/or the module performing this function corresponds to a standard data protocol. The use of a standard data protocol makes it possible to a great extent to fall back on hardware and/or software modules that are already available when designing the interface module according to the invention.

Finally, according to the teaching of the invention, a program for displaying and/or quickly analyzing the received data is loaded into the operator units in addition to an operating system. Such a program can be structured like a browser, making it possible to use standard hardware and software components exclusively in the area of a client computer. An individual component adapted to decode transmitted processing instructions, particularly forwarding instructions, can then be downloaded from the server computer if it is not already available on a client computer. Such an individual component can, for example, have the characteristic of one or more user-specific special functions within the context of the browser program. When a (new) client computer logs on for the first time, the server computer should therefore query whether the individual component is already loaded into this client computer and, if necessary, should make it available in a form compatible with the operating system of the client computer. New computer units are currently delivered with many programs, including a standard browser program. As a result, once such a computer is connected and the standard software that comes with it has been installed, hardly any additional work is required. Instead, the computer can be taken into operation almost immediately even by persons who are not familiar with the program according to the invention. The only special requirement may be the availability of a network card that is compatible with the corresponding network to ensure smooth interaction between the different hardware components.

The interface function block according to the invention can be implemented in the server computer as a self-contained program part. It can also be configured as a hardware device that can be connected to the server computer and can be initialized either via the server computer or by an operator. It can also be a separate computer with input and output means. In the case of a separate component it is quite feasible—after converting the functions to be carried out to a ladder diagram—to implement the functionality in the manner of an analog computer using only hardware components.

BRIEF DESCRIPTION OF THE DRAWINGS

Further features, details, advantages and effects of the invention will now be described with reference to preferred embodiments of the invention and the drawing in which.

DETAILED DESCRIPTION OF THE PREFERRED EMBODIMENTS

The two drawing figures show different network structures 1, 2 in which the invention is advantageously incorporated. The part of the circuit drawn with solid lines corresponds to a minimal configuration while the dash-dotted lines indicate optional units.

Figure 1:
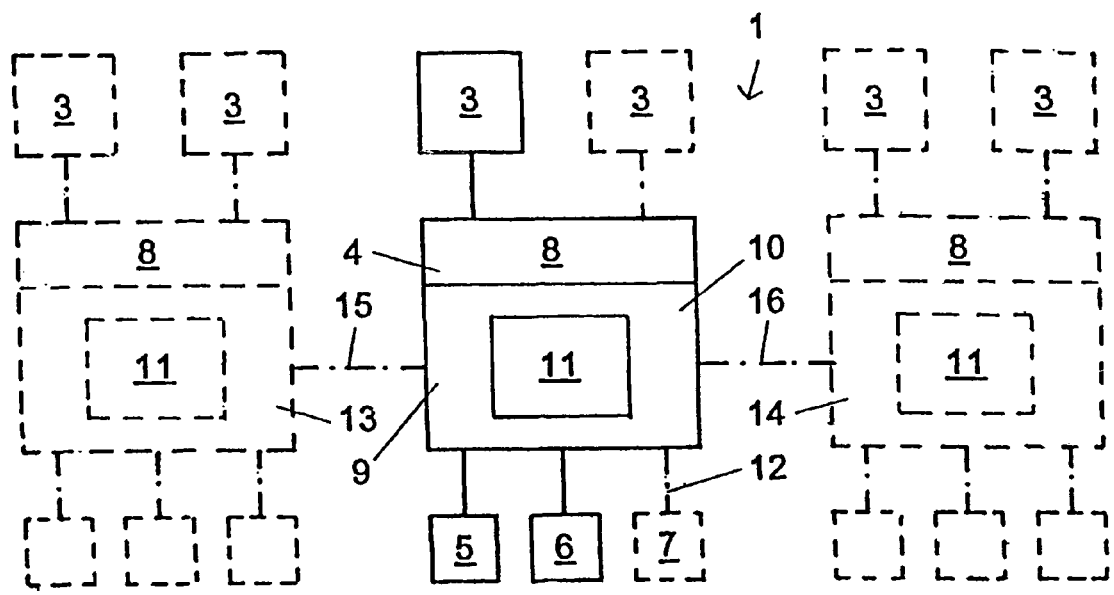
FIG. 1 is a block diagram of a first arrangement operated using s method according to the invention.

In the minimal configuration according to FIG. 1, at least one control device 3 is provided for controlling a plant part in accordance with an internal program. The respective state of the plant part can be determined with an operating and/or monitoring device 4 and can be displayed for the control personnel, for example on a display screen 5 connected thereto. In addition, at least one operator terminal 6 remote from the operating and/or monitoring device 4 is provided, with which the same functionality can be realized at a remote location as with the input and/or output means 5 of the operating and/or monitoring device 4 itself. In order to be able to communicate without interference from this operator terminal 6 and possibly other operator terminals 7 with the operating and/or monitoring function block 8 of the operating and/or monitoring device 4, the operating and/or monitoring device 4 has an interface function block 9 that coordinates the actions of the different input and output devices 5 to 7 and the operating and/or monitoring function block 8.

An additional task of the interface function module 9 is to supplement an operating and/or monitoring function block 8 that may not be operable in a network in combination with other operator terminals 6, 7 so as to enable a communication in the manner of a server-client network in conjunction with standardized computers 6, 7. The operating and/or monitoring device 4 acts as the server, which includes not only the actual operating and/or monitoring functionality 8 but also is able to expand the communication options to a plurality of, e.g., 50, client computers 6, 7.

To perform this first task, a management part 10 is provided in the interface function block 9. This management part 10 is configured to determine the source terminal 6, 7 of data that has been entered, e.g., commands or information, and to forward this data to the operating and/or monitoring function block 8, e.g., after supplementing it with an identifier associated with the corresponding terminal 6, 7. The operating and/or monitoring function block 8 then causes the connected control device 3 to make a corresponding operating correction.

An execution part 11, which to a large extent can take over the computing work of the connected client computers 6, 7, is embedded in the interface function block 9 as well. This involves, in particular, the selection of the screen masks to be displayed on a display screen of a client computer 6, 7 and the arrangement thereof within the scope of a user interface, so that, for example, a data stream corresponding to the desired picture information is generated and sent from the interface function block 9 to the corresponding client computer 6, 7. The client computer's only task is then to determine the destination device from an added instruction, e.g., "output on display screen," and to forward the data stream to the correct addressee.

This has the advantage on the one hand that all of the information on the momentary state of the individual user interfaces of all the connected client computers 6, 7 is available in the interface function block 10 and thus in the operating and/or monitoring device 4. As a result, this state can be readily transferred from one client computer 6 to another client computer 7 if, for example, a maintenance or startup person changes his or her location. The type of the information that can be output in the various screen masks can be very easily modified by loading not only a changed operating and/or monitoring function block 8 but also a correspondingly adapted interface function block 9 into the operating and/or monitoring device 4. The different client computers 6, 7 do not need to be changed, so that modifications of a control structure 3 and the resulting changes in the monitoring structure can be accomplished with the least possible programming and installation effort.

The remote client computers 6, 7 can be comparatively freely selected with respect to their hardware and their operating system, provided that the connected peripheral devices, such as display screen, keyboard, etc. correspond to a design that is supported by the interface function component 9. Besides the operating system, the client computers 6, 7 only require a program to display and/or quickly analyze the information received from the interface function block 9 and to transmit the completely entered information (such as after a completion key has been pressed) to the interface function block 9. Ideally, standard browser programs can be used for this purpose, which for a concrete application may be supplemented by one or more individual components to enable a bidirectional flow of information.

The coupling of the individual client computers 6, 7 to the operating and/or monitoring device 4 can be realized in various ways, e.g.: via data lines that converge radially at the server computer 4; via a network with a ring structure where each connected client computer has been given an individual address; and/or via infrared or wireless interfaces, each with one or more channels, etc. It is also feasible to couple a remote client computer 7 via a national or an international data network, in which case communication can be via satellite across oceans. Here it is very advantageous if the network structure is able to use virtually any client computer hardware with virtually any operating system and all standard browser programs that can be operated under this operating system, so that different standard components that may be more widely used in other countries do not interfere during communication. It is also advantageous if preferably standard data protocols are used on the connection lines 12. All of these measures result in a previously unimagined flexibility and universality, whereby, e.g., the operating and/or monitoring device 4 can be reached from just about any computer to monitor and possibly modify the operation of a control device 3. Once the connection 12 with the operating and/or monitoring device 4 has been set up, an individual component that may perhaps be required can be downloaded from the operating and/or monitoring device 4.

FIG. 1 further shows that a connection between different server computers 4, 13, 14 is also possible. This connection, too, is preferably established via the interface function block 9 according to the invention. Using these connections, which can be implemented, for example, within the context of a company's internal Intranet 15 or an external, national or international data network 16, makes it possible, on the one hand, to exchange the information required for optimal operation of the correspondingly connected control devices 3. On the other hand, these connections make it possible to look at information, especially operating parameters of an otherwise monitored 13 part of the same plant from a specific client computer 6, 7, or even at operating parameters of a remote production location via the Internet 16. It is also possible to influence these operating parameters using these connections. Specifically, additional channels of the interface function blocks 9 according to the invention are used for this purpose, in order to enable, in particular, a connection of corresponding function blocks 9 of other operating and/or monitoring devices 13, 14.

Figure 2:
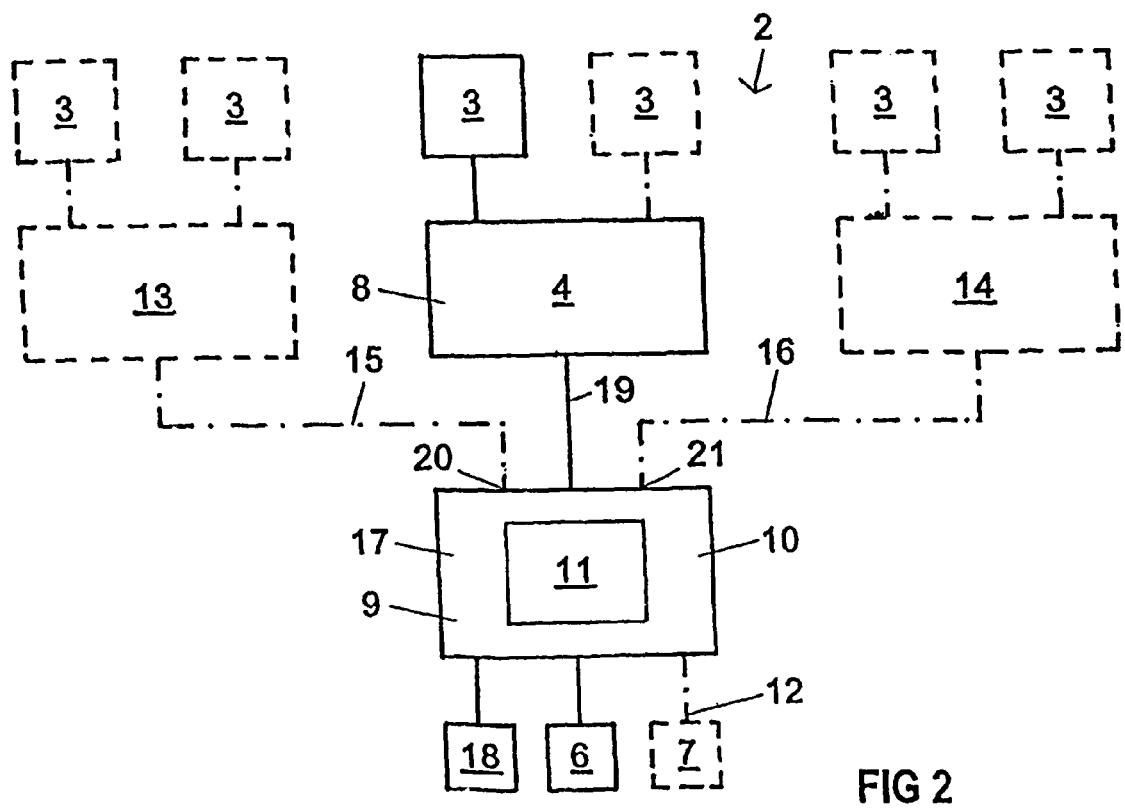
FIG. 2 is a block diagram of another arrangement according to the invention.

The network structure 2 shown in FIG. 2 is distinguished from the network structure 1 of FIG. 1 in particular in that the interface function block 9 is not implemented together with the actual operating and/or monitoring function block 8 in one and the same device but in a separate interface unit 17, which, inter alia, is configured as a stand-alone computer and may be equipped with peripherals 18, in particular a display screen and a keyboard. The interface unit 17 is connected with the actual operating and/or monitoring device 4, e.g., via a cable connection 19. The means to connect different client computers 6, 7 fully correspond with the means described with reference to the network structure 1.

If, in addition to the communications channel 19 for communicating with the neighboring operating and/or monitoring device 4, other inputs and/or outputs 20, 21 are provided, one and the same client computer 6, 7 can be used to reach control devices 3 that are installed and monitored via other server computers 13, 14 and to monitor and possibly modify the operation at that location. This connection to other operating and/or monitoring devices 13, 14 can be established either via a company-internal Intranet 15 or an external Internet 16. In this case, the interface function block 17 has the characteristics of a multiplexer, which can forward incoming information from one and the same operator terminal 6, 7 to different operating and/or monitoring devices 4, 13, 14.

Means for remote control make it possible to realize so-called "flying terminals," where the operator can use a portable device (a laptop or the like) to access different servers of a plant without knowing the configuration data there. This merely requires the setting up of the connection and the correct addressing. Such "flying terminals" never need to be updated.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for at least one of operating and observing a device for monitoring at least one control device that is coupled with a plant, comprising:

utilizing at least one connected remote operator unit that communicates with the monitoring device; and providing a function block which intervenes as an interface module in communications between the monitoring device on the one hand and the connected remote operator unit on the other hand, which evaluates information addressed to the connected remote operator unit, and which processes the information such that the connected remote operator unit directly displays the information as a terminal, wherein the interfacing function block individually addresses a plurality of connected remote operator units, and wherein the interfacing function block manages all the connected remote operator units.

2. Method as claimed in claim 1, wherein the function block is provided in the monitoring device.

3. Method as claimed in claim 2, wherein, for execution, the interfacing function block comprises an additional program part loaded at least partially into a working memory of the monitoring device.

4. Method as claimed in claim 1, wherein the function block is provided in a device external to but connected to the monitoring device.

5. Method as claimed in claim 4, wherein, for execution, the interfacing function block comprises an additional program part loaded at least partially into a working memory of the interface device connected to the monitoring device.

6. Method as claimed in claim 1, wherein the function block comprises a software program.

7. Method as claimed in claim 6, wherein the interfacing software program is configured to be multiply addressed by at least the connected remote operator unit, to execute individual computations associated with the addressing operator unit, and to store the computation results in a uniquely assigned manner in the addressing operator unit.

8. Method as claimed in claim 1, wherein the function block intervenes between a monitoring function block of the monitoring device and the connected remote operator unit.

9. Method as claimed in claim 8, wherein communication between the interfacing function block and the monitoring function block of the monitoring device is combined in one channel.

10. Method as claimed in claim 9, wherein the interfacing function block comprises a plurality of channels for communicating with a plurality of monitoring function blocks.

11. Method as claimed in claim 1, wherein the interfacing function block performs, at least partially, operator unit functions.

12. Method as claimed in claim 6, wherein the operator unit functions comprise operator unit program steps.

13. Method as claimed in claim 1, wherein the interfacing function block is configured to be multiply addressed by at least the connected remote operator unit, to execute individual computations associated with the addressing operator unit, and to store the computation results in a uniquely assigned manner in the addressing operator unit.

14. Method as claimed in claim 1, wherein the interfacing function block, is configured to be multiply addressed by plural, differing operator units, to execute individual computations associated respectively with the plural operator units, and to store the computation results in a uniquely assigned manner in the respective operator units.

15. Method as claimed in claim 1, wherein the interface function block is configured to be addressed with differing parameters of the monitoring device, in order to access the plurality of operator units individually.

16. Method as claimed in claim 15, wherein the interface function block is addressed by at least one of monitoring logic and a monitoring program of the monitoring device.

17. Method as claimed in claim 15, wherein the differing parameters comprise device addresses.

18. Method as claimed in claim 1, wherein the interfacing function block comprises a plurality of channels for communicating with a plurality of monitoring devices.

19. Method as claimed in claim 1, wherein the interface function block additionally manages memory areas associated with the connected remote operator units.

20. Method as claimed in claim 19, wherein the interface function block manages the memory areas associated with the connected remote operator units for buffering incoming information.

21. Method as claimed in claim 1, wherein, the interfacing function block comprises a software program and a new remote operator unit is initially logged on by the function block by calling a respective starting address for the new operator unit.

22. Method as claimed in claim 21, wherein, when an assigned starting address is called, the software program of the interfacing function block first checks whether an operator unit has already logged on and, if not, first executes an initialization phase.

23. Method as claimed in claim 22, wherein the initialization phase comprises communicating with a monitoring block of the monitoring device.

24. Method as claimed in claim 21, wherein, when the starting address for the new remote operator unit assigned to the software program is called, an additional management data record is created and a memory area assigned for the new remote operator unit.

25. Method as claimed in claim 24, wherein, when the new remote operator unit is logged on, information on the hardware structure of the new remote operator unit is queried and stored in the management data record assigned for the new remote operator unit.

26. Method as claimed in claim 1, wherein the interfacing function block comprises a management part and an execution part that is called up by the management part, that is supplied with information associated with a given one of the connected remote operator units, that subsequently executes program steps that are associated with the given connected remote operator unit, and that outputs result information.

27. Method as claimed in claim 26, wherein the result information comprises a bitmap configured to be loaded into a screen memory of the given connected remote operator unit.

28. Method as claimed in claim 26, wherein the information comprises information on hardware characteristics of the given connected remote operator unit stored in a respective management data record, and wherein the information is used by the execution part to generate the result information in a suitable format.

29. Method as claimed in claim 28, wherein the information comprises information defining screen memory size for the given connected remote operator unit.

30. Method as claimed in claim 26, wherein the result information of the execution part is converted into a predefined transmission data format by the management part and is transmitted to the given connected remote operator unit.

31. Method as claimed in claim 30, wherein the result information is transmitted to the given connected remoter operator unit together with an instruction to load the transmitted result information as a bitmap into a screen memory of the given connected remote operator unit.

32. Method as claimed in claim 1, wherein a transmission data format used in communicating between the connected remote operator units and the interfacing function block utilizes a standard data protocol.

33. Method as claimed in claim 1, wherein the connected remote operator units are provided with, in addition to an operating system, a program for at least one of displaying and analyzing data received from the interfacing function block.

34. A method for at least one of operating and observing a device for monitoring at least one control device that is coupled with a plant, comprising:
utilizing at least one connected remote operator unit that communicates with the monitoring device; and
providing a function block which intervenes as an interface module in communications between the monitoring device on the one hand and the connected remote operator unit on the other hand, which evaluates information addressed to the connected operator unit, and which processes the information such that the connected remote operator unit directly displays the information as a terminal,
wherein the interfacing function block individually addresses a plurality of connected remote operator units, and
wherein the interfacing function block, in downlink-side communication from the monitoring device to the connected remote operator units, operates as a distributor.

35. Method as claimed in claim 34 wherein the interfacing function block, in the downlink-side communication from the monitoring device to the connected remote operator units, operates as a demultiplexer.

36. A method for at least one of operating and observing a device for monitoring at least one control device that is coupled with a plant, comprising:
utilizing at least one connected remote operator unit that communicates with the monitoring device; and
providing a function block which intervenes as an interface module in communications between the monitoring device on the one hand and the connected remote operator unit on the other hand, which evaluates information addressed to the connected remote operator unit, and which processes the information such that the connected remote operator unit directly displays the information as a terminal,
wherein the interfacing function block individually addresses a plurality of connected remote operator units, and
wherein the interfacing function block, in uplink-side communication from the connected remote operator units to the monitoring device, operates as a signal combining module.

37. Method as claimed in claim 36, wherein the interfacing function block, in the uplink-side communication from the connected remote operator units to the monitoring device, operates as a multiplexer.

38. Method as claimed in claim 36, wherein the uplink-side communication is priority-controlled.

39. Method as claimed in claim 38, wherein, when a priority is assigned to one of the connected remote operator units, incoming information from another of the operator units is suppressed or is redirected into a buffer associated with the other operating unit.

40. An assembly, comprising:
at least one controller coupled into an industrial plant;
a monitoring device and operator units remote from and communicating with the monitoring device, configured to monitor the at least one controller; and
an interface function block coupled as an interface module into communication between the monitoring device and the operator units, and configured to analyze information addressed respectively to the operator units and to process the information such that the respective operator units display the processed information as a terminal,
wherein the interface function block comprises:
a management part configured to manage the operator units, and
an execution part, which is configured to be called by the management part, to be supplied with information associated with the operator units, to execute program steps respectively associated with the operator units, and to output data resulting from the execution as result information, respectively, to the operator units.

41. Assembly as claimed in claim 40, further comprising additional monitoring devices, wherein the interface function block comprises a plurality of channels for communicating respectively with the plurality of monitoring devices.

42. Assembly as claimed in claim 40, further comprising a plurality of monitoring function blocks, wherein the interface function block comprises a plurality of channels for communicating respectively with the plurality of monitoring function blocks.

43. Assembly as claimed in claim 40, wherein the interface function block is incorporated into the monitoring device.

44. Assembly as claimed in claim 40, wherein the interface function block is external to the monitoring device.

45. Assembly as claimed in claim 40, wherein the monitoring device comprises a monitoring function block.

46. Assembly as claimed in claim 40, wherein the result information comprises bitmaps to be loaded into screen memories of the respective operator units.

* * * * *